(12) United States Patent
Arora

(10) Patent No.: US 12,425,241 B2
(45) Date of Patent: Sep. 23, 2025

(54) METHODS, SYSTEMS AND COMPUTER PROGRAM PRODUCTS FOR GENERATION AND TRANSFER OF NON-FUNGIBLE TOKENS

(71) Applicant: Bluestack Systems, Inc., Campbell, CA (US)

(72) Inventor: Sohil Arora, Gurugram (IN)

(73) Assignee: NOW.GG, INC., Campbell, CA (US)

( * ) Notice: Subject to any disclaimer, the term of this patent is extended or adjusted under 35 U.S.C. 154(b) by 177 days.

(21) Appl. No.: 18/082,052

(22) Filed: Dec. 15, 2022

(65) Prior Publication Data
US 2023/0188350 A1  Jun. 15, 2023

Related U.S. Application Data

(60) Provisional application No. 63/289,811, filed on Dec. 15, 2021.

(51) Int. Cl.
*H04L 9/00* (2022.01)

(52) U.S. Cl.
CPC ............ *H04L 9/50* (2022.05); *H04L 2209/60* (2013.01)

(58) Field of Classification Search
CPC ....... H04L 9/3213; H04L 9/3239; H04L 9/50; H04L 2209/56; H04L 2209/60; H04L 2209/603
See application file for complete search history.

(56) References Cited

U.S. PATENT DOCUMENTS

| | | | |
|---|---|---|---|
| 11,182,467 B1 * | 11/2021 | Medina | .................. G06F 3/147 |
| 2006/0130131 A1 | 6/2006 | Pai et al. | |
| 2017/0024818 A1 | 1/2017 | Wager et al. | |
| 2017/0046689 A1 | 2/2017 | Lohe et al. | |
| 2017/0103468 A1 | 4/2017 | Orsini et al. | |
| 2018/0158162 A1 | 6/2018 | Ramsamy | |
| 2022/0366762 A1 * | 11/2022 | Nelson | ................ G07F 17/3244 |
| 2023/0138023 A1 * | 5/2023 | Yang | ...................... A63F 13/86 463/42 |

* cited by examiner

*Primary Examiner* — Kevin Bechtel
(74) *Attorney, Agent, or Firm* — The Webb Law Firm

(57) ABSTRACT

The invention provides solutions for generation and transfer of digital media based non-fungible tokens on a distributed blockchain ledger, for implementation with cloud based services systems, and even more particularly for implementation within cloud gaming systems. The invention relies on a cloud services server and a non-fungible token service platform for implementing the generation and/or transfer of digital media based non-fungible tokens on a distributed blockchain ledger, in accordance with the present invention.

7 Claims, 12 Drawing Sheets

METHODS, SYSTEMS AND COMPUTER PROGRAM PRODUCTS FOR GENERATION AND TRANSFER OF NON-FUNGIBLE TOKENS

CROSS-REFERENCE TO RELATED APPLICATION

This application claims priority to United States Provisional Patent Application No. 63/289,811 filed Dec. 15, 2021, the disclosure of which is hereby incorporated by reference in its entirety.

BACKGROUND OF THE INVENTION

Field of the Invention

The present invention relates to generation and transfer of non-fungible tokens. In particular, the present invention provides methods, systems and computer program products for generation and transfer of non-fungible tokens for implementation with cloud based services systems, and even more particularly for implementation within cloud gaming systems.

Description of Related Art

Blockchain technology is increasingly used for implementing digital assets, that have been generated in the form of non-fungible tokens (or NFTs). Non-fungible tokens are generally different from other digital tokens or currencies. Non-fungible tokens are tokenized versions of digital or real-world assets. They can function as verifiable proofs of authenticity and ownership within a blockchain network. In general, non-fungible tokens are not interchangeable with each other and may be understood as implementing rights management solutions within the digital domain. While non-fungible tokens can be bought or sold using fungible tokens such as digital currency or non-digital currency, non-fungible tokens themselves comprise a unique asset class and are not substitutable like fungible tokens. Identifying information is embedded in each non-fungible token's smart contract, making each non-fungible token unique. In general, this uniqueness makes non-fungible tokens unsuitable for conventional crypto trading purposes and token currency exchanges but ideal for recording and storing the ownership of digital items like collectibles, games and even art. However, generating non-fungible tokens and securely buying or selling such non-fungible tokens remains complex—and therefore out of the reach of the average user of computer devices and software services.

Simultaneously, with the increase in availability of affordable computing hardware, it has become commonplace for individuals to use a plurality of computing devices or data processing devices for accessing cloud based, or network based, services—including for example, cloud bases gaming services. Such cloud based services offer significant opportunities for generation of unique and valuable non-fungible tokens—given the various different forms of digital media content, and the marketability of digital media content that is associated with popular personalities or with significant digital events. For example, FIG. 1 illustrates a non-fungible token comprising a screenshot of an artwork image of a type that could be part of a cloud based computer game. However, the complexities associated with generating non-fungible tokens in connection with cloud based services are yet greater, presenting even more obstacles to widespread adoption and use.

There is accordingly a need for solutions that enable straightforward, secure and convenient generation of non-fungible tokens arising in connection with cloud based services, and for securely buying, selling or otherwise transferring ownership or control of such non-fungible tokens.

SUMMARY OF THE INVENTION

The invention enables generation and transfer of non-fungible tokens for implementation with cloud based services systems, and even more particularly for implementation within cloud gaming systems.

The invention provides a method for recording a digital media based non-fungible token on a distributed blockchain ledger. The method comprises (i) establishing a cloud services network communication session between a cloud services server and a client terminal, wherein establishing the cloud services network communication session includes assigning to said cloud services network communication session, a network communication channel between the cloud services server and the client terminal, (ii) streaming from the cloud services server to the client terminal, over the network communication channel, data generated by an instance of a software application that is running on the cloud services server, (iii) receiving through the client terminal (a) an instruction to generate a non-fungible token comprising digital media content that has been selected from the data that has been streamed from the cloud services server to the client terminal, and (b) user input identifying the selected digital media content, (iv) generating a non-fungible token record representing the non-fungible token, wherein the non-fungible token record includes data identifying or representing the selected media content, and (v) implementing recordal of the non-fungible token on a distributed blockchain ledger, comprising (c) transmitting the non-fungible token record to a non-fungible token services platform, and (d) storing data from the non-fungible token record in a record block associated with the distributed blockchain ledger.

The invention also provides a method for recording transfer of a digital media based non-fungible token on a distributed blockchain ledger. The method comprises (i) receiving at a cloud services server, a request for display of digital media based non-fungible tokens associated with the cloud services server or with a cloud services application that is executed on the cloud services server, (ii) retrieving data corresponding to a set of digital media based non-fungible tokens that are associated with the cloud services server or with a cloud services application, (iii) implementing display of the retrieved data corresponding to the set of non-fungible tokens, (iv) receiving a user input selecting a non-fungible token from within the set of digital media based non-fungible tokens, (v) transmitting to a non-fungible token services platform, a request to reserve the selected non-fungible token for transfer, wherein the non-fungible token services platform is configured to record transfer of non-fungible tokens within a distributed blockchain ledger on which the selected non-fungible token is recorded, (vi) responding to a confirmation message from the non-fungible token services platform confirming that the selected non-fungible token has been reserved for transfer, by implementing a payment transaction for transfer of the selected non-fungible token to an identified transferee and (vii) subsequent to completion of the payment transaction for transfer of the selected non-fungible token to the identified transferee, initiating recordal of transfer of the selected non-fungible token to the identified transferee in a record block associated with the distributed blockchain ledger.

The invention also provides a system for recording a digital media based non-fungible token on a distributed blockchain ledger. The system comprises a processor implemented cloud services server configured for (i) establishing a cloud services network communication session between the cloud services server and a client terminal, wherein establishing the cloud services network communication session includes assigning to said cloud services network communication session, a network communication channel between the cloud services server and the client terminal, (ii) streaming from the cloud services server to the client terminal, over the network communication channel, data generated by an instance of a software application that is running on the cloud services server, (iii) receiving through the client terminal (a) an instruction to generate a non-fungible token comprising digital media content that has been selected from the data that has been streamed from the cloud services server to the client terminal, and (b) user input identifying the selected digital media content, (iv) generating a non-fungible token record representing the non-fungible token, wherein the non-fungible token record includes data identifying or representing the selected media content, and (v) implementing recordal of the non-fungible token on a distributed blockchain ledger, comprising transmitting the non-fungible token record to a non-fungible token services platform—wherein the non-fungible token services platform stores data from the non-fungible token record in a record block associated with the distributed blockchain ledger.

In another embodiment, the invention provides a system for recording transfer of a digital media based non-fungible token on a distributed blockchain ledger. The system comprises a processor implemented cloud services server configured for (i) receiving at the cloud services server, a request for display of digital media based non-fungible tokens associated with the cloud services server or with a cloud services application that is executed on the cloud services server, (ii) retrieving data corresponding to a set of digital media based non-fungible tokens that are associated with the cloud services server or with a cloud services application, (iii) implementing display of the retrieved data corresponding to the set of non-fungible tokens, (iv) receiving a user input selecting a non-fungible token from within the set of digital media based non-fungible tokens, (v) transmitting to a non-fungible token services platform, a request to reserve the selected non-fungible token for transfer, wherein the non-fungible token services platform is configured to record transfer of non-fungible tokens within a distributed blockchain ledger on which the selected non-fungible token is recorded, (vi) responding to a confirmation message from the non-fungible token services platform confirming that the selected non-fungible token has been reserved for transfer, by implementing a payment transaction for transfer of the selected non-fungible token to an identified transferee, and (vii) subsequent to completion of the payment transaction for transfer of the selected non-fungible token to the identified transferee, initiating recordal of transfer of the selected non-fungible token to the identified transferee in a record block associated with the distributed blockchain ledger.

The invention provides a computer program product for recording a digital media based non-fungible token on a distributed blockchain ledger. the computer program product comprises a non-transitory computer readable medium having a computer readable program code embodied therein, the computer readable program code comprising instructions for implementing the steps of (i) establishing a cloud services network communication session between a cloud services server and a client terminal, wherein establishing the cloud services network communication session includes assigning to said cloud services network communication session, a network communication channel between the cloud services server and the client terminal, (ii) streaming from the cloud services server to the client terminal, over the network communication channel, data generated by an instance of a software application that is running on the cloud services server, (iii) receiving through the client terminal (a) an instruction to generate a non-fungible token comprising digital media content that has been selected from the data that has been streamed from the cloud services server to the client terminal, and (b) user input identifying the selected digital media content, (iv) generating a non-fungible token record representing the non-fungible token, wherein the non-fungible token record includes data identifying or representing the selected media content, and (v) implementing recordal of the non-fungible token on a distributed blockchain ledger, comprising (c) transmitting the non-fungible token record to a non-fungible token services platform, and (d) storing data from the non-fungible token record in a record block associated with the distributed blockchain ledger.

The invention also provides a computer program product for recording transfer of a digital media based non-fungible token on a distributed blockchain ledger. The computer program product comprises a non-transitory computer readable medium having a computer readable program code embodied therein, the computer readable program code comprising instructions for implementing the steps of (i) receiving at a cloud services server, a request for display of digital media based non-fungible tokens associated with the cloud services server or with a cloud services application that is executed on the cloud services server, (ii) retrieving data corresponding to a set of digital media based non-fungible tokens that are associated with the cloud services server or with a cloud services application, (iii) implementing display of the retrieved data corresponding to the set of non-fungible tokens, (iv) receiving a user input selecting a non-fungible token from within the set of digital media based non-fungible tokens, (v) transmitting to a non-fungible token services platform, a request to reserve the selected non-fungible token for transfer, wherein the non-fungible token services platform is configured to record transfer of non-fungible tokens within a distributed blockchain ledger on which the selected non-fungible token is recorded, (vi) responding to a confirmation message from the non-fungible token services platform confirming that the selected non-fungible token has been reserved for transfer, by implementing a payment transaction for transfer of the selected non-fungible token to an identified transferee and (vii) subsequent to completion of the payment transaction for transfer of the selected non-fungible token to the identified transferee, initiating recordal of transfer of the selected non-fungible token to the identified transferee in a record block associated with the distributed blockchain ledger.

DESCRIPTION OF THE INVENTION

The invention provides solutions for generation and transfer of non-fungible tokens for implementation with cloud based services systems, and even more particularly for implementation within cloud gaming systems.

Figure 1:
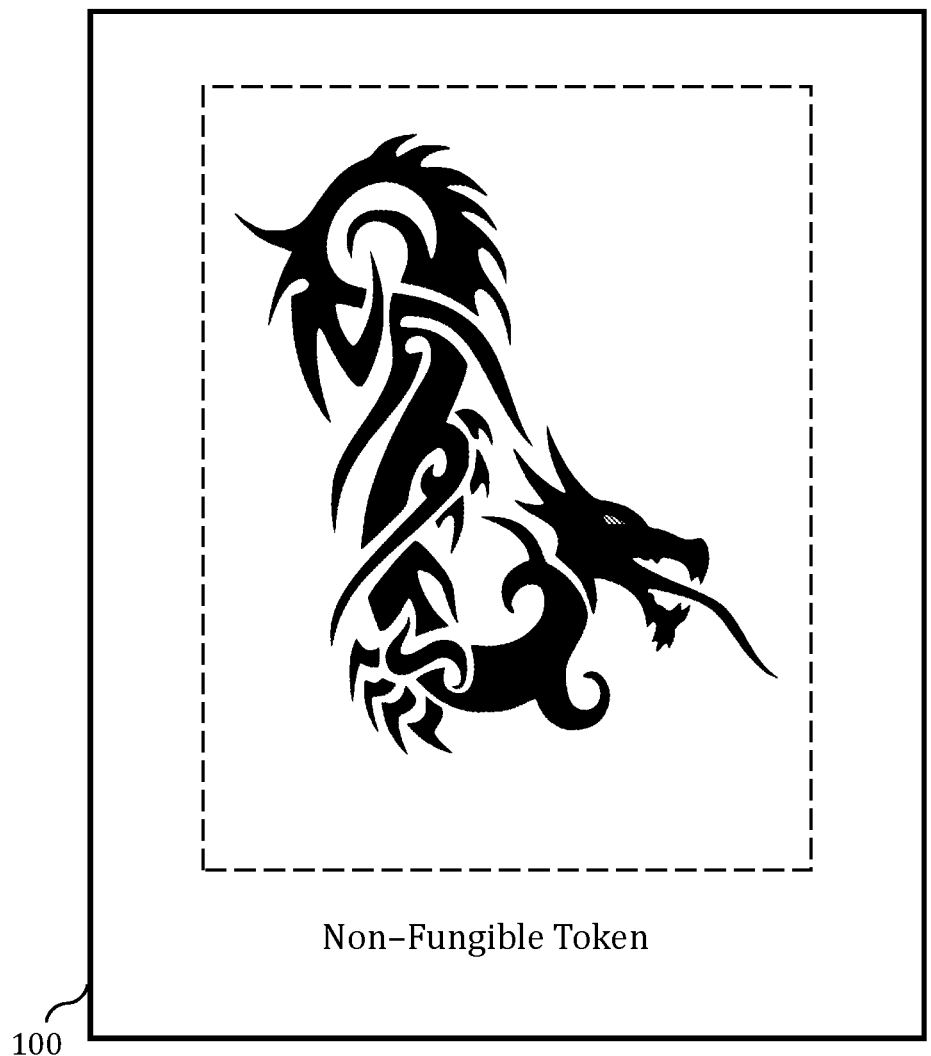
FIG. 1 illustrates an exemplary non-fungible token.
Figure 2:
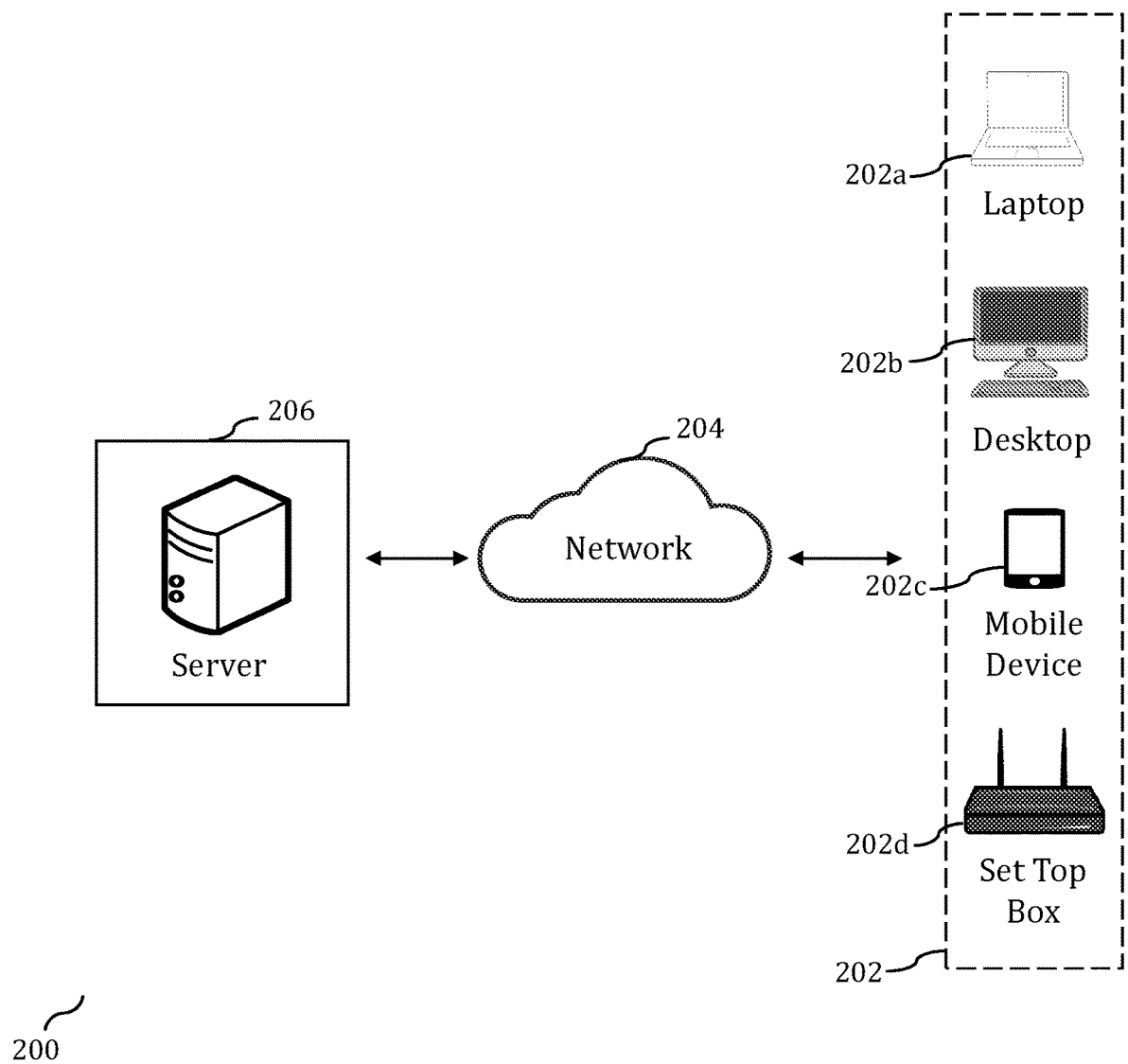
FIGS. 2 and 3 illustrate system environments of a kind that may be used to implement the teachings of the present invention.

The methods of the present invention may be implemented within a system environment 200 of a kind illustrated in FIG. 2. System environment 200 comprises one or more client devices 202 (for example, any of laptop 202a, desktop 202b, mobile device 202c and/or set top box 202d) interfacing through network 204, with a server 206. The server 206 may be configured to support a conventional server-client arrangement, where the client device 202 may communicate with server 206 for any one or more of several purposes, including for example downloading a software application, configuring the downloaded software application, updating the downloaded software application, or enabling client device 202 to upload or download data.

Alternatively, server 206 may be configured to provide cloud based service(s) to a requesting client device 202, wherein a software application required by client device 202 is installed and run on server 206, and video and audio output data from the software application is streamed to and rendered on client device 202. The inputs received from a user or operator of the client device 202 are in turn transmitted back to server 206 and are used to control execution of the software application that is running on the server 206.

So for example, in a cloud based gaming environment, a game software is installed and run on a hardware device configured to run the game software—and which is integrated or coupled with server 206. The game software is run on the hardware device and video and audio gameplay data is streamed from the hardware device (optionally through server 206) to a client device 202, where it is rendered for display and/or audio playback. A gameplayer who is operating client device 202 uses the interface controls of client device 202 to provide gameplay inputs—which are streamed back to the hardware device on which the game software is being executed and is used as gameplay control inputs for the game software that is being run on said hardware device.

Figure 3:
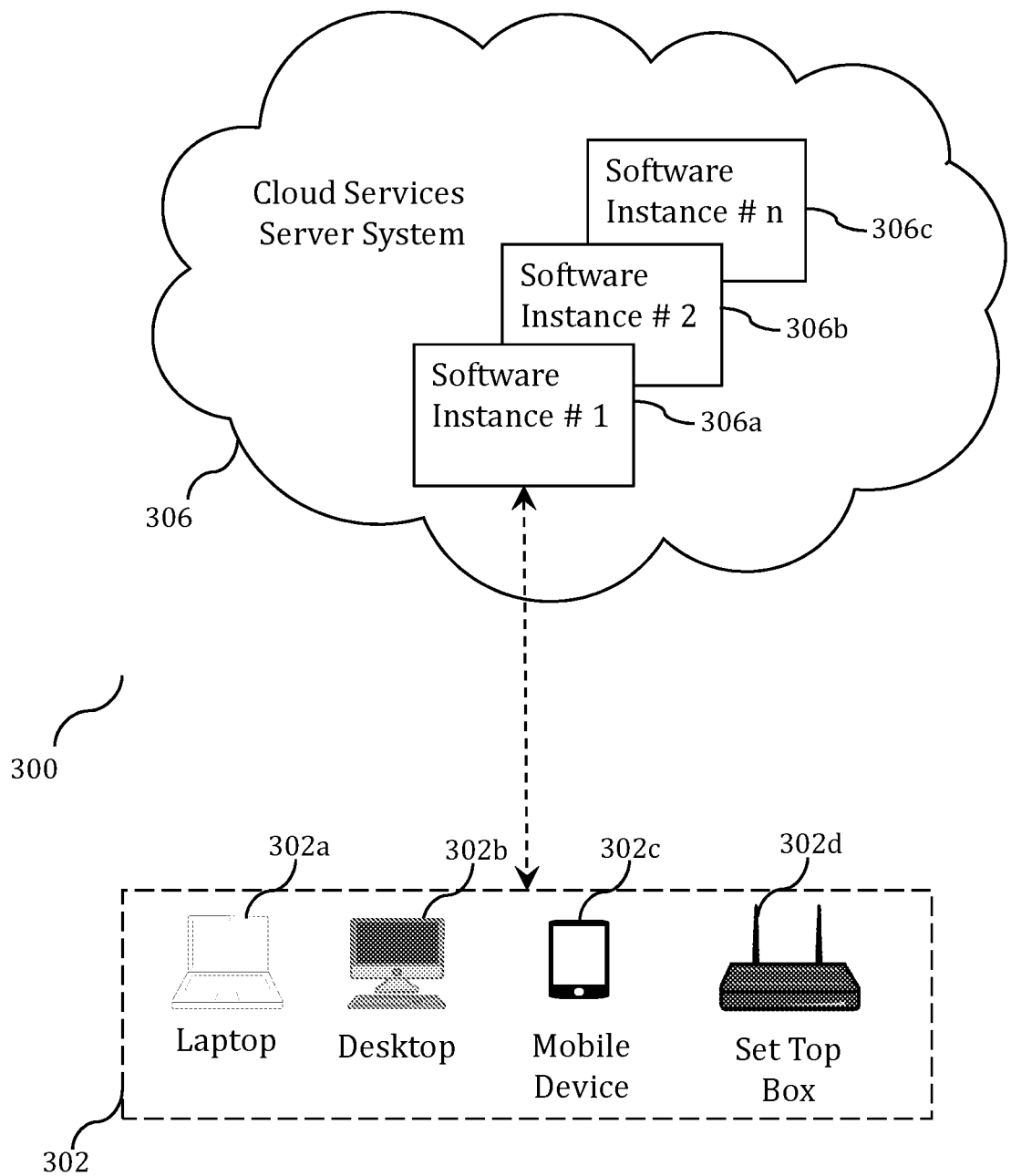

FIG. 3 illustrates a more specific embodiment of a system environment 300 of the kind that has been more generally described in connection with FIG. 2.

System environment 300 comprises one or more client devices 302 (for example, any of laptop 302a, desktop 302b, mobile device 302c and/or set top box 302d) interfacing through a communication network such as a data network or the internet (not shown), with a cloud services server system 306. The cloud services server system 306 may comprise (or may be coupled with) a plurality of discrete or distinct hardware systems—each of which is configured to be provisioned with, and to instantiate and run a discrete instance of one or more software applications. As a result, cloud services server system 306 may utilize the plurality of discrete or distinct hardware systems to simultaneously run software instance #1 (306a), software instance #2 (306b), upto software instance #n (306c)—such that video and/or audio data from each of these software instance 306a to 306c may be streamed to one or more requesting client devices 302a to 302d.

By way of an example:
- client device 302a may request cloud services server system 306 for cloud based execution of a first software application—and cloud services server system 306 may respond by (i) instantiating a first instance of this first software application to run on a first hardware system, and (ii) streaming video and/or audio data from the first instance of the first software application to client device 302a.
- client device 302b may request cloud services server system 306 for cloud based execution of a second software application (which may be the same as the first software application, or may comprise a different software application)—and cloud services server system 306 may respond by (i) instantiating a second instance of this second software application to run on a second hardware system, and (ii) streaming video and/or audio data from the second instance of the second software application to client device 302a
- client device 302c may request cloud services server system 306 for cloud based execution of an $n^{th}$ software application (which may be the same as either of the first or second software applications, or may be different from both)—and cloud services server system 306 may respond by (i) instantiating an $n^{th}$ instance of this $n^{th}$ software application to run on an $n^{th}$ hardware system, and (ii) streaming video and/or audio data from the $n^{th}$ instance of the $n^{th}$ software application to client device 302c.

Figure 4:
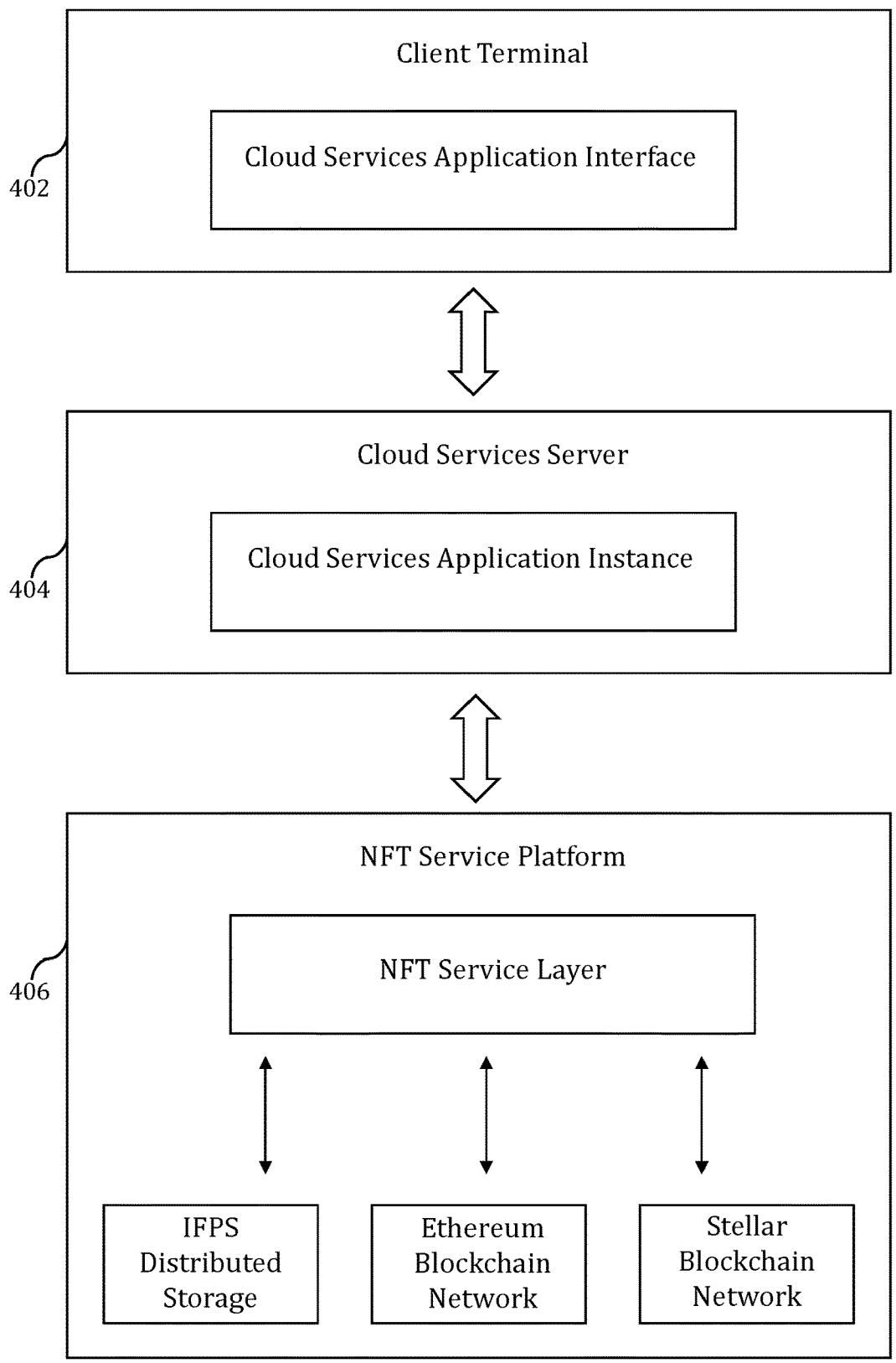
FIG. 4 illustrates an exemplary configuration for a system configured to enable generation of non-fungible tokens associated with a cloud based services, in accordance with the teachings of the present invention.

FIG. 4 illustrates an exemplary configuration for a system 400 configured to enable generation of non-fungible tokens associated with cloud based services, in accordance with the teachings of the present invention.

As shown in FIG. 4, system 400 may comprise a client terminal 402, a cloud services server 404 and an NFT services platform 406.

Client terminal 402 may comprise any processor based client device or terminal through which a user accesses cloud based services. In various examples, client terminal 402 may include any of a laptop, desktop, mobile device or set top box that is configured to interface through a communication network such as a data network or the internet, with cloud services server 404. Client terminal 402 has implemented therewithin a cloud services application interface 4022—which is configured to enable client terminal 402 to communicate over a data network or communication network with cloud services server 404—and to receive from cloud services server 404 one or more cloud based services. In various embodiments, cloud services application interface 4022 may comprise an interface provided by a cloud services client software application or by a web browser based interface implemented within client terminal 402.

Cloud services server 404 may comprise any processor based server(s) having one or more cloud services application instance(s) 4042 being implemented thereon—wherein cloud based services from a cloud services application instance 404 that is under execution are transmitted or delivered over a communication network from cloud services server 404 to a client terminal 402.

As described in more detail below, one or both of client terminal 402 and cloud services server 404 is/are additionally configured to enable generation of non-fungible tokens based on media content generated or delivered pursuant to cloud based services being provided by cloud services server 404 to client terminal 402.

NFT service platform 406 comprises a server implemented platform that is communicably coupled with, or that is in network communication with, cloud services server 404. One or both of cloud services server 404 and NFT services platform 406 is/configured to enable non-fungible tokens that are generated pursuant to the methods of the present invention to be published to and saved on a blockchain infrastructure. As illustrated in FIG. 4, NFT service platform 406 may comprise NFT service layer 4062—comprising a processor implemented software interface that enables cloud services server 404 (and/or cloud services application instance(s) 4042) to communicate with NFT service platform 4062 for the purposes of publishing, saving, retrieving or otherwise accessing non-fungible tokens that are generated based on cloud based services provided by cloud services server 4040 to a client terminal 402. The NFT service layer 4062 may be configured to communicate with one or more blockchain networks or elements of blockchain infrastructure including without limitation any of the Inter-Planetary File System (IFPS) distributed storage system 4044, the Ethereum blockchain network 4046, the Stellar Blockchain network 4068 or any other blockchain network or blockchain data storage system. Non-fungible tokens generated in accordance with the teachings of the present invention may be stored within the blockchain infrastructure by NFT service layer 4062 interacting with any such blockchain networks or elements of blockchain infrastructure.

The system 400 of FIG. 4 may be used to implement any of the methods described subsequently in this written description.

Figure 5:
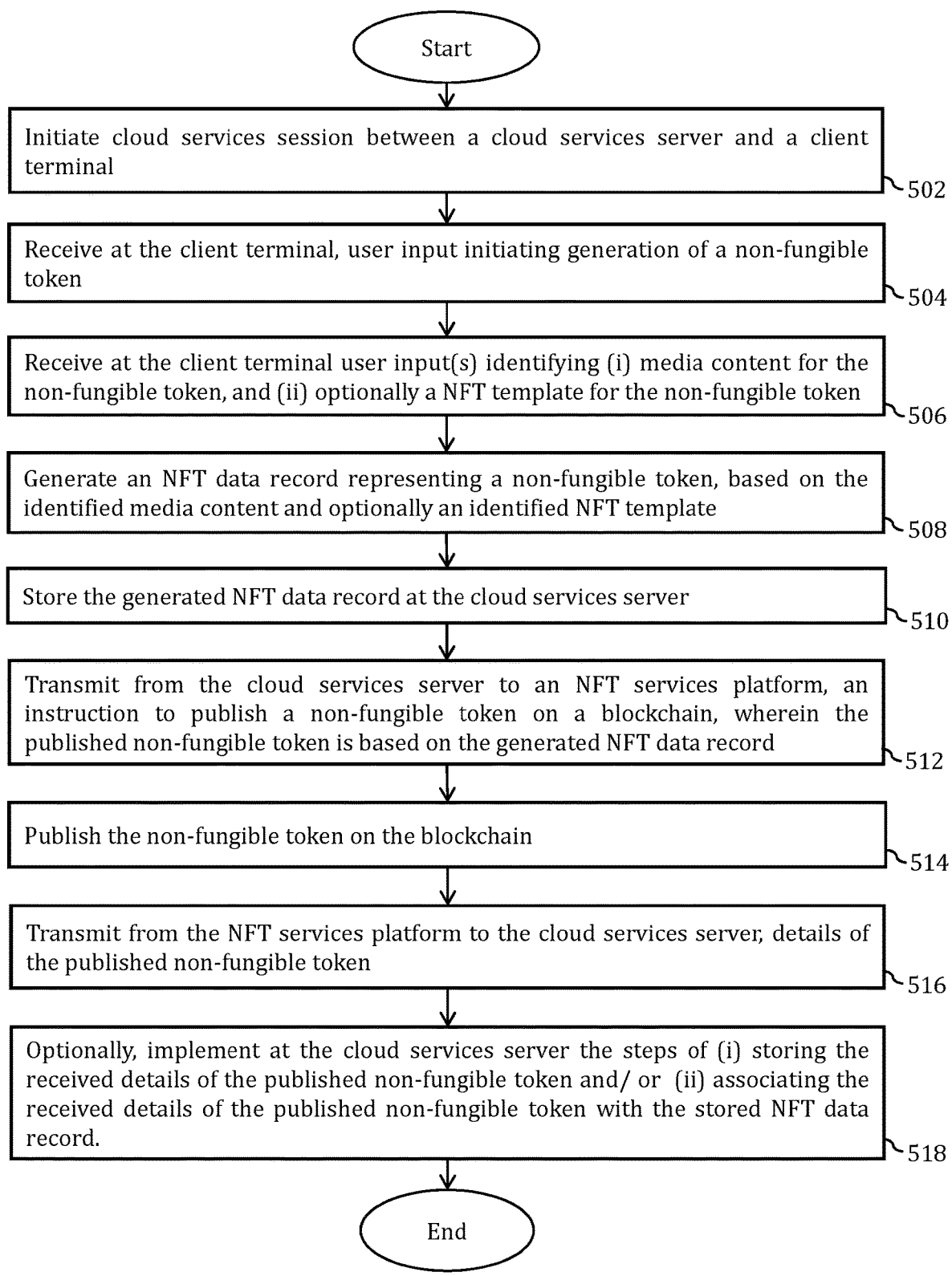
FIG. 5 is a flowchart illustrating method steps involved in generating a non-fungible token based on media content associated with cloud based services.

FIG. 5 is a flowchart illustrating method steps involved in generating a non-fungible token based on media content associated with cloud based services. In an embodiment, the method of FIG. 5 may be implemented within system 400 as illustrated in connection with FIG. 4.

Step 502 comprises initiating a cloud services network communication session between a cloud services server 404 and a client terminal 402. In an embodiment, the initiated cloud services network communication session may comprise a network communication session involving at least one of cloud services application instance 4042 and cloud services application interface 4022. The cloud services network communication session may serve as a network communication session through which cloud based software services implemented within cloud services application instance 4042 are delivered to a user through client terminal 402. Initiation of the cloud services network communication session may include establishing a physical or logical data communication channel between the cloud services server 404 and the client terminal 402. Initiation of the cloud services network communication session is followed by transmission of video data and/or audio data to the client terminal 402 within the duration of the network communication session—and in an embodiment, said transmission may be implemented over the physical or logical data communication channel established between the cloud services server 404 and the client terminal 402. In an embodiment of the invention, one or more of the remaining steps 504 to 518 of the method of FIG. 5 may be implemented within a duration of the cloud services network communication session.

Step 504 comprises receiving at client terminal 402, user input initiating generation of a non-fungible token. The user input may be received through a user interface provided by client terminal 402 and may include an instruction to generate a non-fungible token comprising media content that has been generated at or delivered to client terminal 402 as a result or consequence of the cloud based service(s) being provided at client terminal 402, within the cloud services network communication session by cloud services server 404. Client terminal 402 may be configured to generate, and transmit to cloud services server 404, an instruction for generating the non-fungible token—wherein the transmitted instruction is based on the user input received at client terminal 402.

Step 506 comprises receive at the client terminal 402, user input(s) identifying (i) media content for inclusion within the non-fungible token, and (ii) optionally a non-fungible token template for the non-fungible token. The non-fungible token template may be selected from among a plurality of available non-fungible token templates based on user inputs or user selections received at client terminal 402. The non-fungible template includes data which determines a layout/format/template for displaying, presenting or playback of the non-fungible token. The received user input(s) may be transmitted from the client terminal 402 to cloud services server 404.

Step 508 comprises generating a non-fungible token data record representing a non-fungible token—wherein generation of the non-fungible token record is based on the identified media content and optionally on the identified non-fungible token template. In various embodiments, the non-fungible token data record may be generated either at client terminal 402 or at cloud services server 404. In an embodiment where the non-fungible token data record is generated at cloud services server 404, the step of generating the non-fungible token is preceded by transmission of the identified media content and optionally, the non-fungible token template from client terminal 402 to cloud services server 404.

Step 510 comprises storing the generated non-fungible token data record at the cloud services server 404.

Step 512 comprises transmitting from the cloud services server 404 to NFT services platform 406, an instruction to record or publish a non-fungible token on a blockchain, wherein the published non-fungible token is based on the non-fungible token data record that has been generated at step 508. Step 512 may additionally include transmitting the non-fungible token record from cloud services server 404 to NFT services platform 406.

Step 514 may be implemented at NFT services platform 406, and comprises publishing the non-fungible token on one or more blockchains. In an embodiment, publishing the non-fungible token at step 514 may comprise the step of storing data within the generated non-fungible token data record within any blockchain that is communicably coupled with or in network communication with NFT services platform 406.

Step 516 comprises transmitting from the NFT services platform 406 to the cloud services server 404, details of the published non-fungible token.

Step 518 comprises optionally implementing at the cloud services server 404, the steps of (i) storing the received details of the published non-fungible token and/or (ii) associating the received details of the published non-fungible token with the stored non-fungible token data record.

Figure 6:
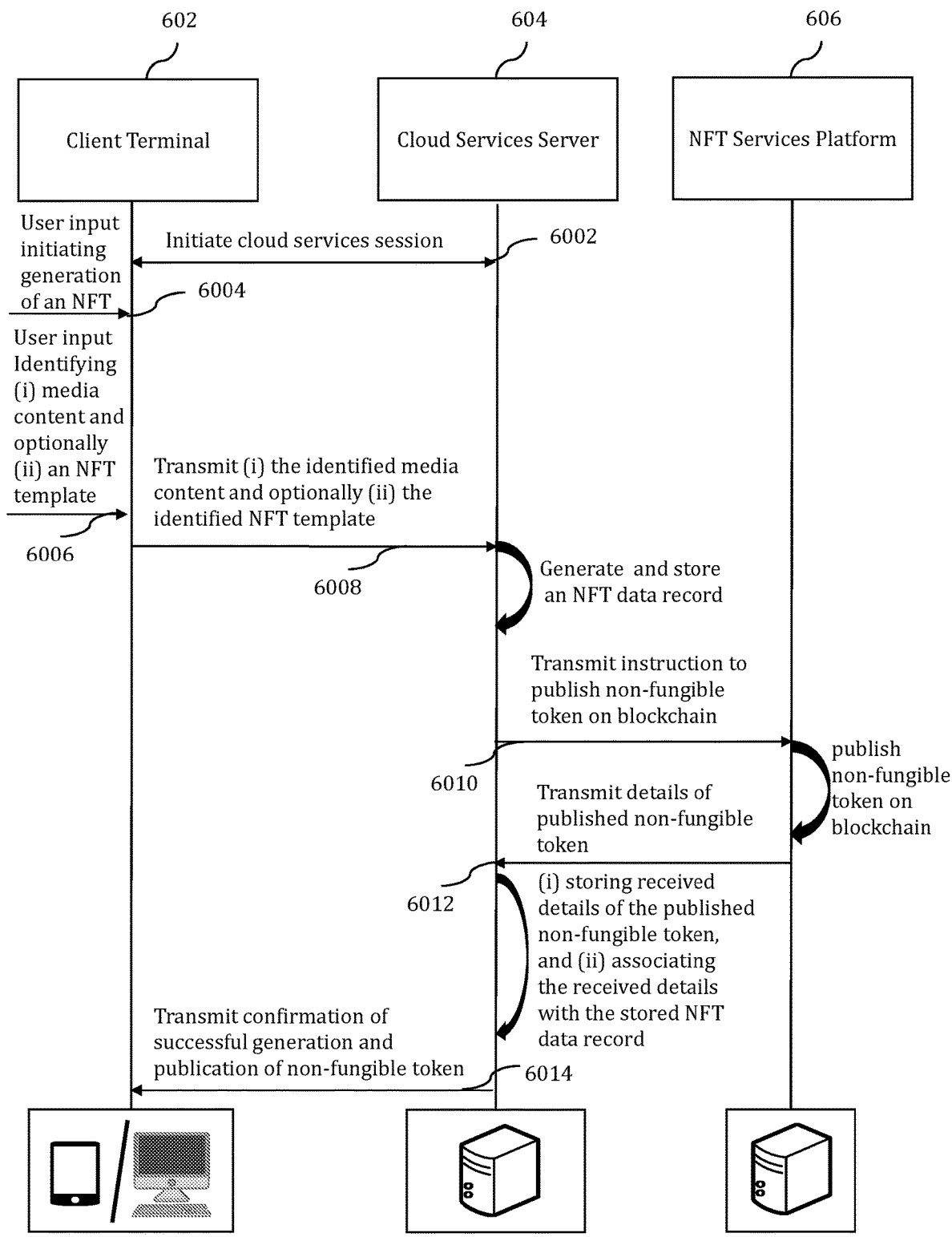
FIG. 6 is a communication flow diagram illustrating communication flow between system entities for implementing the method of FIG. 5.

FIG. 6 is a communication flow diagram illustrating communication flow between system entities for implementing the method of FIG. 5.

Step 6002 comprises initiating a cloud services network communication session between a cloud services server 604 and a client terminal 602. The cloud services network communication session may serve as a network communication session through which cloud based software services implemented by cloud services server 604 are delivered to a user through client terminal 602.

Step 6004 comprises receiving at client terminal 602, user input initiating generation of a non-fungible token. The user input may be received through a user interface provided by client terminal 602 and may include an instruction to generate a non-fungible token comprising media content that has been generated at or delivered to client terminal 602 as a result or consequence of the cloud based service(s) being provided at client terminal 602, within the cloud services network communication session by cloud services server 604.

Step 6006 comprises receive at the client terminal 602, user input(s) identifying (i) media content for inclusion within the non-fungible token, and (ii) optionally a non-fungible token template for the non-fungible token. The non-fungible token template may be selected from among a plurality of available non-fungible token templates based on user inputs or user selections received at client terminal 602.

Step 6008 comprises transmitting from client terminal 602 to cloud services server 604, (i) the identified media content and (ii) optionally the identified non-fungible token template.

Cloud services server 604 thereafter generates and stores a non-fungible token data record representing a non-fungible token—wherein generation of the non-fungible token is based on the identified media content and optionally on the identified non-fungible token template received from client terminal 602.

Step 6010 comprises transmitting from the cloud services server 604 to NFT services platform 606, an instruction to publish a non-fungible token on a blockchain, wherein the published non-fungible token is based on the non-fungible token data record that has been generated by cloud services server 604.

The NFT services platform 606 thereafter publishes the non-fungible token on one or more blockchains. In an embodiment, publishing the non-fungible token may comprise the step of storing data within the generated non-fungible token data record within any blockchain that is communicably coupled with or in network communication with NFT services platform 606.

Step 6012 comprises transmitting from the NFT services platform 606 to the cloud services server 404, details of the published non-fungible token.

The cloud services server 604 thereafter implements the steps of (i) storing the received details of the published non-fungible token and/or (ii) associating the received details of the published non-fungible token with the stored non-fungible token data record.

Step 6014 comprises transmitting from cloud services server 604 to client terminal 602, confirmation of successful generation and publication of the non-fungible token.

Figure 7:
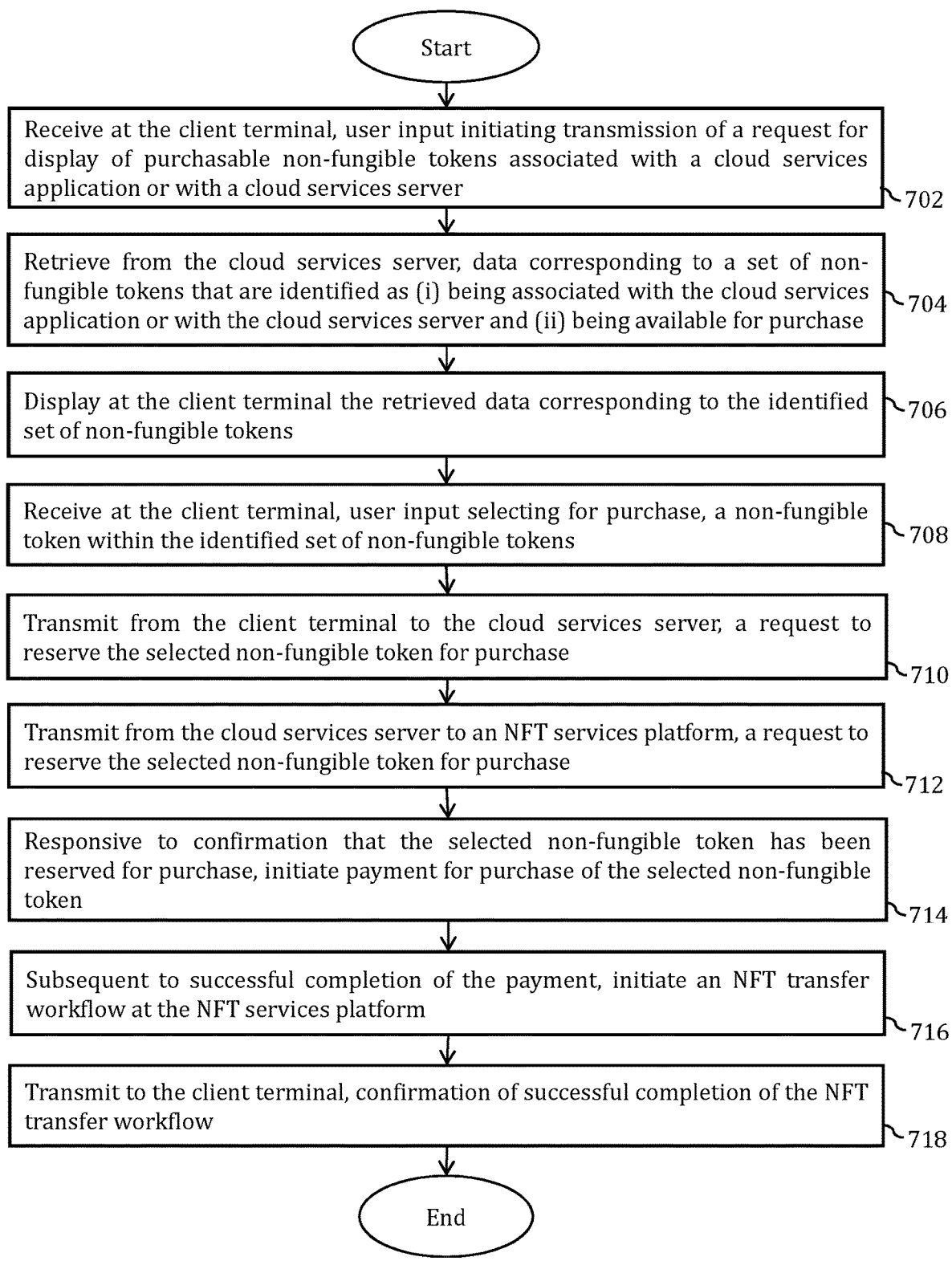
FIG. 7 is a flowchart illustrating method steps involved in transferring a non-fungible token that is associated with cloud based services.

FIG. 7 is a flowchart illustrating method steps involved in transferring a non-fungible token that is associated with cloud based services. In an embodiment, the method of FIG. 7 may be implemented within system 400 as illustrated in connection with FIG. 4.

Step 702 comprises receiving at client terminal 402, user input initiating transmission of a request requesting display of purchasable non-fungible tokens associated with a cloud services application or with a cloud services server. The user input may include input specifying or selecting a cloud services application or a cloud services server with which the non-fungible tokens should be associated. In an embodiment, by specifying or selecting a cloud services application or a cloud services server with which the non-fungible tokens should be associated, the user input seeks to ensure that the displayed non-fungible tokens include media content corresponding to, associated with, or generated by the specified cloud services application cloud services server.

Step 704 comprises retrieving from the cloud services server 404, data corresponding to a set of non-fungible tokens that are (i) associated with the cloud services application or with the cloud services server and/or that include media content associated with, corresponding to, or generated by the cloud services application or with the cloud services server, and (ii) available for purchase/transfer.

Step 706 comprises displaying at client terminal 402, the retrieved data corresponding to the identified set of non-fungible tokens.

Step 708 comprises receiving at client terminal 402, user input selecting for purchase/transfer, one or more non-fungible tokens within the identified set of non-fungible tokens.

Step 710 comprises transmitting from client terminal 402 to cloud services server 404, a request to reserve the selected non-fungible token(s) for purchase/transfer.

Step 712 comprises transmitting from cloud services server 404 to NFT services platform 406, a request to reserve the selected non-fungible token(s) for purchase/transfer—such that the reserved non-fungible token(s) cannot be purchased by or transferred to any third party during the duration of reservation.

Step 714 comprises responding to a confirmation message or acknowledgement message from NFT services platform 406 that the selected non-fungible token(s) has/have been reserved for purchase/transfer, by initiating payment for purchase/transfer of the selected non-fungible token(s).

At step 716, subsequent to a confirmation message or acknowledgement message confirming successful completion of the payment, a transfer workflow (NFT transfer workflow) for transferring ownership of the non-fungible token(s) to the purchaser/transferee is initiated at NFT services platform 406. Transferring ownership of the non-fungible token(s) to the purchaser/transferee comprises recording the transfer of ownership on a distributed blockchain ledger within which the non-fungible token(s) is recorded.

Upon completion of the NFT transfer workflow, step 718 comprises transmitting to client terminal 402, confirmation of successful completion of the transfer of the purchased/transferred non-fungible tokens.

Figure 8:
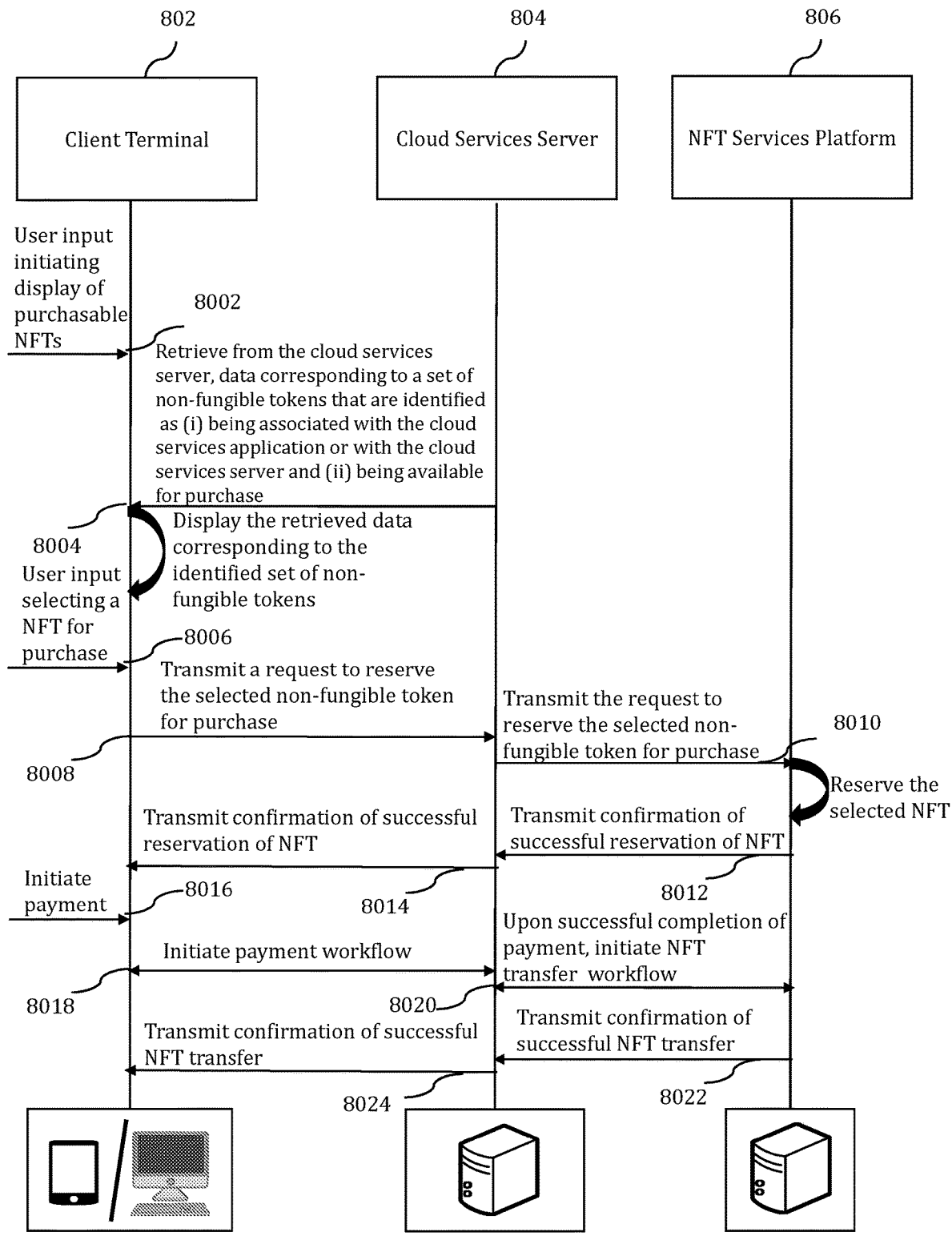
FIG. 8 is a communication flow diagram illustrating communication flow between system entities for implementing the method of FIG. 7.

FIG. 8 is a communication flow diagram illustrating communication flow between system entities for implementing the method of FIG. 7.

Step 8002 comprises receiving at client terminal 802, user input initiating display of purchasable non-fungible tokens associated with a cloud services application or with a cloud services server. The user input may include input specifying or selecting a cloud services application or a cloud services server with which the non-fungible tokens should be associated. In an embodiment, by specifying or selecting a cloud services application or a cloud services server with which the non-fungible tokens should be associated, the user input seeks to ensure that the displayed non-fungible tokens include media content corresponding to, associated with, or generated by the specified cloud services application cloud services server.

Step 8004 comprises retrieving from cloud services server 804, data corresponding to a set of non-fungible tokens that are (i) associated with the cloud services application or with the cloud services server and/or that include media content associated with, corresponding to, or generated by the cloud services application or with the cloud services server, and (ii) available for purchase/transfer.

The retrieved data corresponding to the identified set of non-fungible tokens is displayed on a display at client terminal 802.

Step 8006 comprises receiving at client terminal 802, user input selecting for purchase/transfer, one or more non-fungible tokens within the identified set of non-fungible tokens.

Step 8008 comprises transmitting from client terminal 802 to cloud services server 804, a request to reserve the selected non-fungible token(s) for purchase/transfer. Step 8010 comprises transmitting from cloud services server 804 onward to NFT services platform 806, the request to reserve the selected non-fungible token(s) for purchase/transfer.

The NFT services platform 806 responds to the request transmitted from cloud services server 804 (at step 8010) by reserving the selected non-fungible token(s) for purchase/transfer within the applicable blockchain infrastructure—such that the reserved non-fungible token(s) cannot be purchased by or transferred to any third party during the duration of reservation.

Step 8012 comprises transmitting from NFT Services Platform 806 to cloud services server 804, a confirmation message or acknowledgement message confirming successful reservation of the selected non-fungible token(s). Step 8014 comprises transmitting from cloud services server 804 onward to client terminal 802, a confirmation message or acknowledgement message confirming successful reservation of the selected non-fungible token(s).

Step 8016 comprises responding to a confirmation message or acknowledgement message received at client terminal 802, confirming that the selected non-fungible token(s) has/have been reserved for purchase/transfer, by initiating payment for purchase/transfer of the selected non-fungible token(s). Step 8018 comprises initiating a payment workflow to implement the payment from the purchaser/transferee to the seller.

At step 8020, subsequent to a confirmation message or acknowledgement message confirming successful completion of the payment, a transfer workflow (NFT transfer workflow) for transferring the purchased/transferred non-fungible token(s) to the purchaser/transferee is initiated between NFT services platform 806 and cloud services server 804.

Upon completion of the NFT transfer workflow, step 8022 comprises transmitting from NFT services platform 806 to cloud services server 804, a confirmation message or acknowledgement message confirming successful execution of the transfer of the selected non-fungible token(s). Step 8024 comprises transmitting from cloud services server 804 to client terminal 802, a confirmation message or acknowledgement message confirming successful execution of the transfer of the selected non-fungible token(s)

Figure 9:
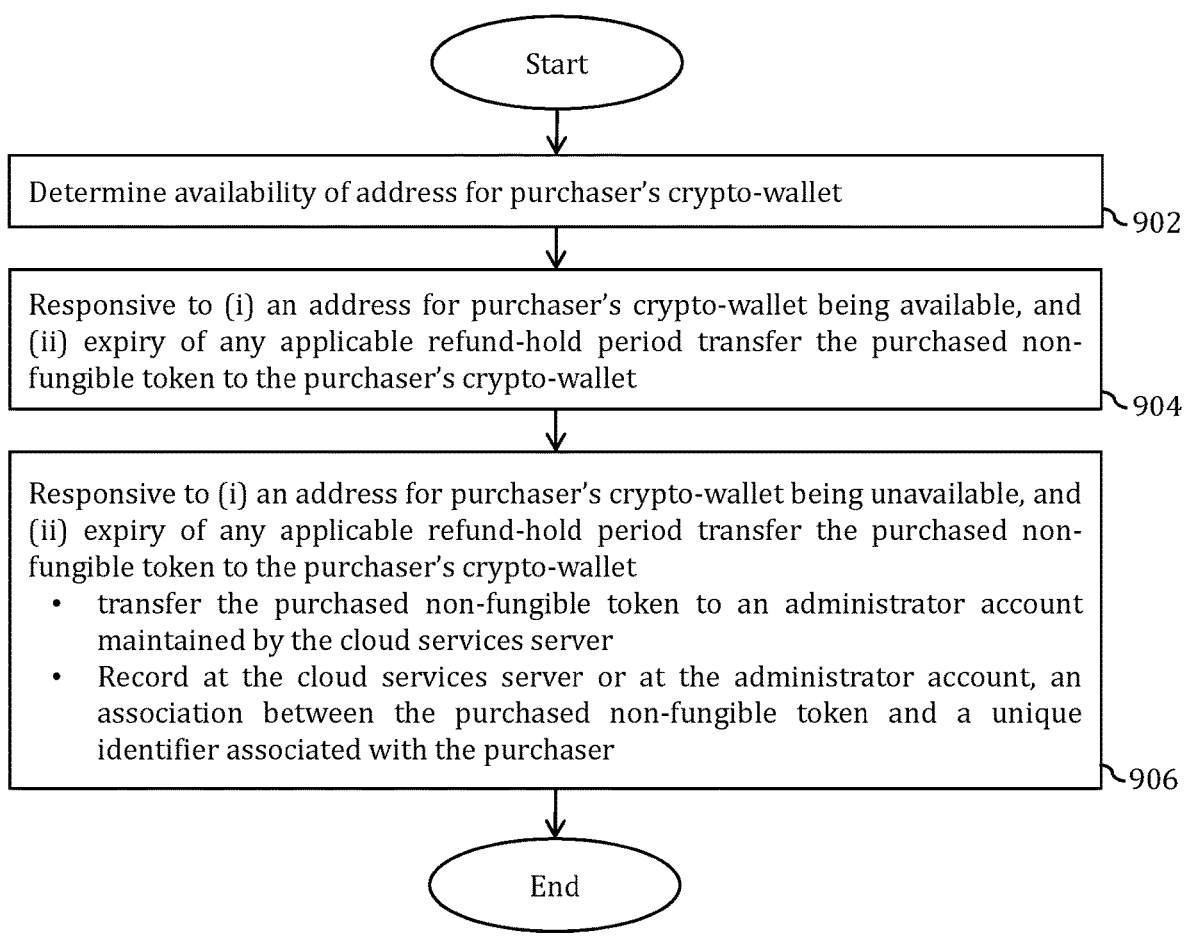
FIG. 9 is a flowchart illustrating method steps involved in a non-fungible token transfer workflow within the method of FIG. 7.

FIG. 9 is a flowchart illustrating method steps involved in a non-fungible token transfer workflow within the method of FIG. 7. In an embodiment, the non-fungible token transfer workflow may be implemented within step 716 of the method of FIG. 7, or within step 8020 of the communication flow of FIG. 8. In an embodiment, the method of FIG. 9 may be implemented within an NFT Services Platform 406, 806.

Step 902 of the method of FIG. 9 comprises determining availability of an address for crypto-wallet of a purchaser or intended purchaser of one or more non-fungible token(s).

Responsive to (i) an address for a purchaser's crypto-wallet being available, and (ii) expiry of any applicable refund-hold period—step 904 comprises transferring the purchased non-fungible token(s) to the purchaser's crypto-wallet. It would be understood for the purposes of step 904 that a refund-hold period may comprise a predefined duration within which a purchaser may initiate a payment cancellation procedure or a payment refund procedure. The purchased non-fungible token(s) are required to be reserved and held without transfer until the predefined refund-hold period expires and can only be transferred to the purchase after expiry of such period.

Responsive to (i) an address for purchaser's crypto-wallet being unavailable, and (ii) expiry of any applicable refund-hold period transfer the purchased non-fungible token to the purchaser's crypto-wallet, step 906 comprises:

transferring the purchased non-fungible token(s) to an administrator account maintained by the cloud services server 404, and recording at the cloud services server 404 or at the administrator account, an association between the purchased non-fungible token(s) and a unique identifier associated with the purchaser—such that the purchased non-fungible token(s) can be later transferred to a crypto-wallet that is owned or controlled by the purchaser and which is also associated with the unique identifier that is associated with the purchaser.

The method of FIG. 9 provides a significant advantage inasmuch that it enables purchasing and storage of non-fungible tokens even when a purchaser does not have a crypto-wallet account to store the purchased non-fungible token. By enabling a purchaser to store a purchased non-fungible token in a cloud services server or an administrator account, along with an identifier associating the non-fungible token with the purchaser, the method of FIG. 9 enables a purchaser to buy, store and subsequently transfer or trade non-fungible tokens without requiring a crypto-wallet account.

Additionally, by implementing a refund hold period (for example at steps 904 or 906 of the method of FIG. 9), the invention ensures compliance with payment and refund policies of various software application distribution platforms (e.g. the Google™ Play Store or the Apple™ App Store) and ensures that application software implementing the methods of the present invention can be distributed through such platforms.

Figure 10:
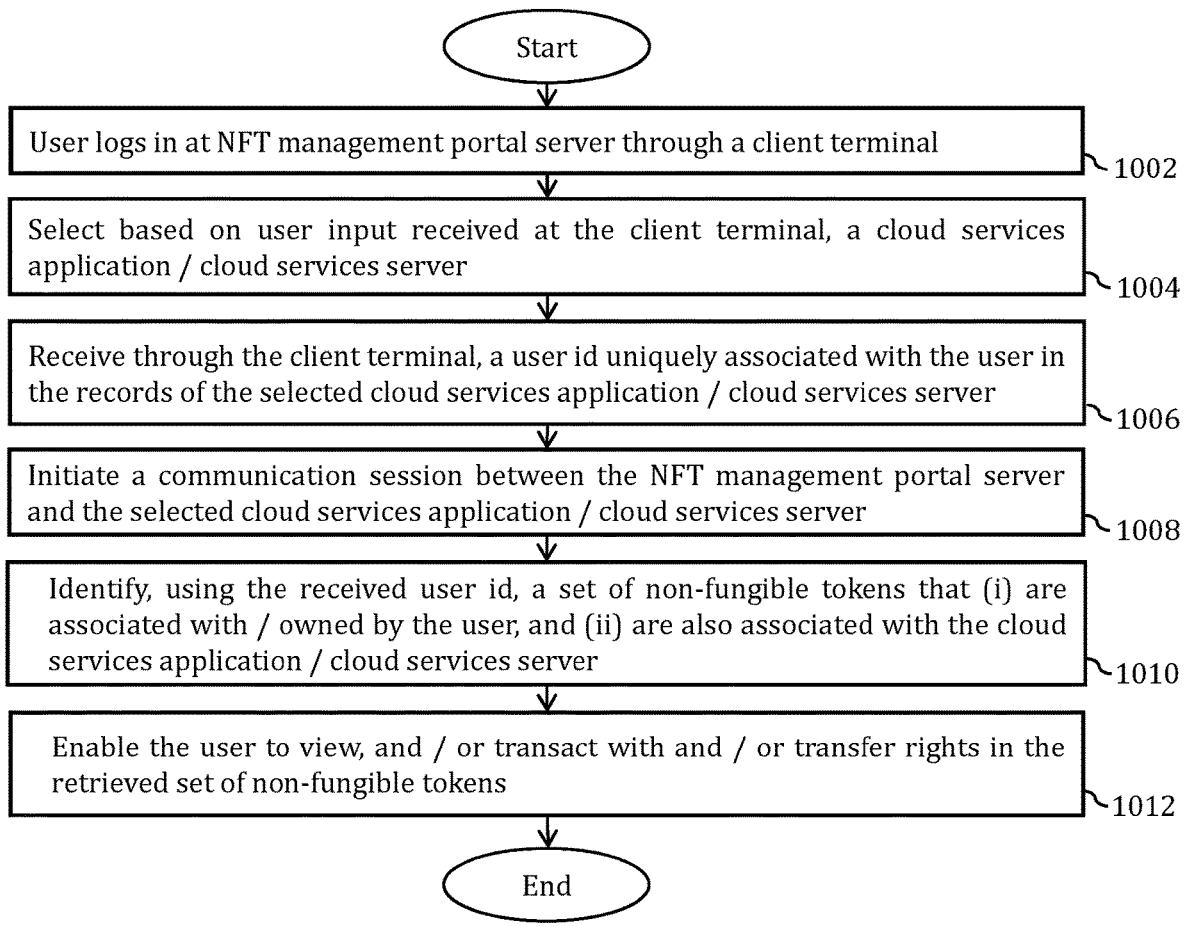
FIG. 10 is a flowchart illustrating method steps involved in access and management of non-fungible tokens through a non-fungible token management portal.

FIG. 10 is a flowchart illustrating method steps involved in accessing and managing non-fungible tokens through a non-fungible token management portal. In an embodiment, the non-fungible token management portal may be implemented at or through a NFT management portal server. In an embodiment, the NFT management portal server may be implemented within or may comprise a part of NFT services platform 406 of FIG. 4.

At step 1002, a user logs in to the NFT management portal server through a client terminal 402.

Step 1004 comprises selecting, based on user input received at client terminal 402, a cloud services application/cloud services server. By selecting a cloud services application/cloud services server, the user seeks to retrieve or view for purchase selection, non-fungible token(s) that include media content associated with or generated based on the selected cloud services application/cloud services server.

Step 1006 comprises receiving by way of user input through client terminal 402, a user id. The received user id comprises an identifier uniquely associated with the user in the records of the selected cloud services application/cloud services server.

Step 1008 comprises initiating a communication session between the NFT management portal server and the selected cloud services application/cloud services server.

Step 1010 comprises identifying, using or based on the received user id, a set of non-fungible tokens that are associated with or owned by the user, and which are simultaneously associated with the cloud services application/cloud services server. In an embodiment step 1010 may comprise identifying from a database of non-fungible tokens associated with the cloud services application/cloud services server, one or more non-fungible tokens that are associated with or linked to the received user id.

Step 1012 comprises enabling the user to view, and/or transact with and/or transfer rights in the retrieved set of non-fungible tokens at the NFT management portal server through the client terminal 402.

Figure 11:
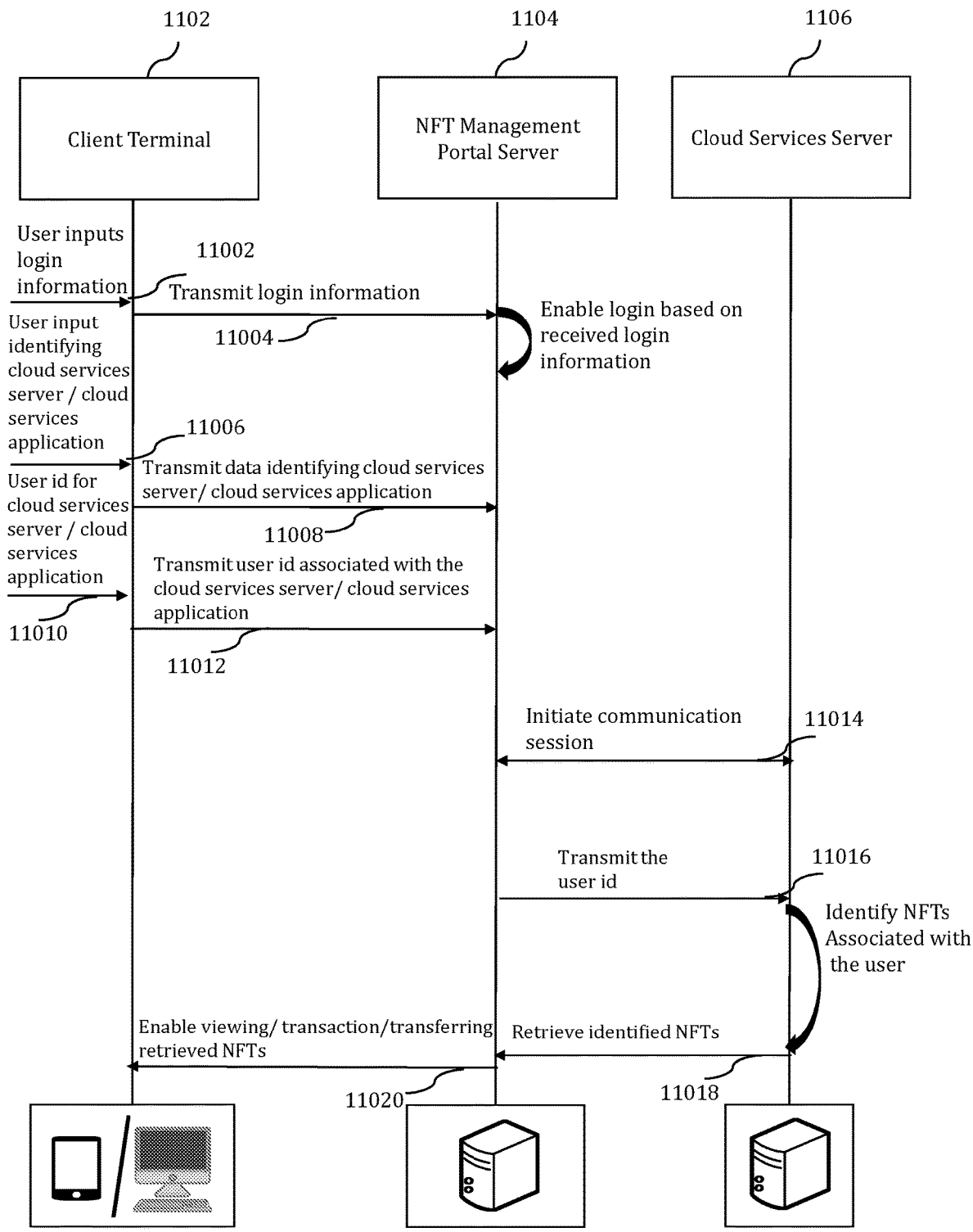
FIG. 11 is a communication flow diagram illustrating communication flow between system entities for implementing the method of FIG. 10.

FIG. 11 is a communication flow diagram illustrating communication flow between system entities for implementing the method of FIG. 10.

At step 11002, a user inputs login information at client terminal 1102.

Step 11004 comprises transmitting the login information from client terminal 1102 to NFT management portal server 1104. NFT management portal server 1104 uses the received login information to authenticate the user's identity—and if the user is found to have an account/access permissions at the NFT management portal, the login information is used to enable the user to login to the NFT management portal.

At step 11006 user input is received at client terminal 1102, identifying a cloud services application/cloud services server. By identifying or selecting a cloud services application/cloud services server, the user seeks to retrieve or view for purchase selection, non-fungible token(s) that include media content associated with or generated based on the identified cloud services application/cloud services server.

Step 11008 comprises transmitting data identifying said cloud services application/cloud services server from client terminal 1102 to NFT management portal server 1104.

Step 11010 comprises receiving by way of user input through client terminal 1102, a user id. The received user id comprises an identifier uniquely associated with the user in the records of the selected cloud services application/cloud services server.

Step 11012 comprises transmitting the received user id from client terminal 1102 to NFT management portal server 1104.

Step 11014 comprises initiating a communication session between NFT management portal server 1102 and the selected cloud services application/cloud services server 1106.

Step 11016 comprises transmitting the user id from NFT management portal server 1104 to cloud services application/cloud services server 1106.

The cloud services application/cloud services server 1106 identifies, using or based on the received user id, a set of non-fungible tokens that are associated with or owned by the user, and which are simultaneously associated with the cloud services application/cloud services server. In an embodiment cloud services application/cloud services server 1106 may identify non-fungible tokens from a database of non-fungible tokens associated with the cloud services application/cloud services server 1106, wherein the identified non-fungible tokens are associated with or linked to the received user id.

Step 11018 comprises retrieving the identified non-fungible tokens from the cloud services application/cloud services server 1106 to NFT management portal server 1104.

Thereafter, step 11020 comprises enabling a user to view, and/or transact with and/or transfer rights in the retrieved non-fungible tokens at the NFT management portal server 1104 through the client terminal 1102.

In a specific embodiment, the invention provides a method for recording a digital media based non-fungible token on a distributed blockchain ledger. The method comprises (i) establishing a cloud services network communication session between a cloud services server and a client terminal, wherein establishing the cloud services network communication session includes assigning to said cloud services network communication session, a network communication channel between the cloud services server and the client terminal, (ii) streaming from the cloud services server to the client terminal, over the network communication channel, data generated by an instance of a software application that is running on the cloud services server, (iii) receiving through the client terminal (a) an instruction to generate a non-fungible token comprising digital media content that has been selected from the data that has been streamed from the cloud services server to the client terminal, and (b) user input identifying the selected digital media content, (iv) generating a non-fungible token record representing the non-fungible token, wherein the non-fungible token record includes data identifying or representing the selected media content, and (v) implementing recordal of the non-fungible token on a distributed blockchain ledger, comprising (c) transmitting the non-fungible token record to a non-fungible token services platform, and (d) storing data from the non-fungible token record in a record block associated with the distributed blockchain ledger.

In an embodiment of the method, (i) the user input received through the client terminal further identifies a non-fungible token template, and (ii) the generated non-fungible token record includes data representing the non-fungible token template—wherein the non-fungible template includes data which determines a layout, format or template for displaying, presenting or playback of the non-fungible token.

In another method embodiment, the cloud services server (i) receives the instruction to generate the non-fungible token and the user input identifying the selected digital media content from the client terminal, (ii) generates the non-fungible token record, (iii) stores the generated non-fungible token record in a memory coupled with the cloud services server, (iv) transmits to the non-fungible token services platform an instruction to record the non-fungible token on the distributed blockchain ledger, and (v) subsequent to recordal of the non-fungible token on the distributed blockchain ledger by the non-fungible token services platform, receives data representing details of the recorded non-fungible token.

In a further embodiment of the method, the cloud services server (i) stores the received data representing details of the recorded non-fungible token, and (ii) associates said details of the recorded non-fungible token with the stored non-fungible token data record.

The invention also provides a method for recording transfer of a digital media based non-fungible token on a distributed blockchain ledger. The method comprises (i) receiving at a cloud services server, a request for display of digital media based non-fungible tokens associated with the cloud services server or with a cloud services application that is executed on the cloud services server, (ii) retrieving data corresponding to a set of digital media based non-fungible tokens that are associated with the cloud services server or with a cloud services application, (iii) implementing display of the retrieved data corresponding to the set of non-fungible tokens, (iv) receiving a user input selecting a non-fungible token from within the set of digital media based non-fungible tokens, (v) transmitting to a non-fungible token services platform, a request to reserve the selected non-fungible token for transfer, wherein the non-fungible token services platform is configured to record transfer of non-fungible tokens within a distributed blockchain ledger on which the selected non-fungible token is recorded, (vi) responding to a confirmation message from the non-fungible token services platform confirming that the selected non-fungible token has been reserved for transfer, by implementing a payment transaction for transfer of the selected non-fungible token to an identified transferee and (vii) subsequent to completion of the payment transaction for transfer of the selected non-fungible token to the identified transferee, initiating recordal of transfer of the selected non-fungible token to the identified transferee in a record block associated with the distributed blockchain ledger.

The invention also provides a system for recording a digital media based non-fungible token on a distributed blockchain ledger. The system comprises a processor implemented cloud services server configured for (i) establishing a cloud services network communication session between the cloud services server and a client terminal, wherein establishing the cloud services network communication session includes assigning to said cloud services network communication session, a network communication channel between the cloud services server and the client terminal, (ii) streaming from the cloud services server to the client terminal, over the network communication channel, data generated by an instance of a software application that is running on the cloud services server, (iii) receiving through the client terminal (a) an instruction to generate a non-fungible token comprising digital media content that has been selected from the data that has been streamed from the cloud services server to the client terminal, and (b) user input identifying the selected digital media content, (iv) generating a non-fungible token record representing the non-fungible token, wherein the non-fungible token record includes data identifying or representing the selected media content, and (v) implementing recordal of the non-fungible token on a distributed blockchain ledger, comprising transmitting the non-fungible token record to a non-fungible token services platform—wherein the non-fungible token services platform stores data from the non-fungible token record in a record block associated with the distributed blockchain ledger.

In an embodiment, the system may be configured such that (i) the user input received through the client terminal further identifies a non-fungible token template, and (ii) the generated non-fungible token record includes data representing the non-fungible token template—wherein the non-fungible template includes data which determines a layout, format or template for displaying, presenting or playback of the non-fungible token.

In another system embodiment, the cloud services server (i) receives the instruction to generate the non-fungible token and the user input identifying the selected digital media content from the client terminal, (ii) generates the non-fungible token record, (iii) stores the generated non-fungible token record in a memory coupled with the cloud services server, (iv) transmits to the non-fungible token services platform an instruction to record the non-fungible token on the distributed blockchain ledger, and (v) subsequent to recordal of the non-fungible token on the distributed blockchain ledger by the non-fungible token services platform, receives data representing details of the recorded non-fungible token.

In another system embodiment, the cloud services server (i) stores the received data representing details of the recorded non-fungible token, and (ii) associates said details of the recorded non-fungible token with the stored non-fungible token data record.

In another embodiment, the invention provides a system for recording transfer of a digital media based non-fungible token on a distributed blockchain ledger. The system comprises a processor implemented cloud services server configured for (i) receiving at the cloud services server, a request for display of digital media based non-fungible tokens associated with the cloud services server or with a cloud services application that is executed on the cloud services server, (ii) retrieving data corresponding to a set of digital media based non-fungible tokens that are associated with the cloud services server or with a cloud services application, (iii) implementing display of the retrieved data corresponding to the set of non-fungible tokens, (iv) receiving a user input selecting a non-fungible token from within the set of digital media based non-fungible tokens, (v) transmitting to a non-fungible token services platform, a request to reserve the selected non-fungible token for transfer, wherein the non-fungible token services platform is configured to record transfer of non-fungible tokens within a distributed blockchain ledger on which the selected non-fungible token is recorded, (vi) responding to a confirmation message from the non-fungible token services platform confirming that the selected non-fungible token has been reserved for transfer, by implementing a payment transaction for transfer of the selected non-fungible token to an identified transferee, and (vii) subsequent to completion of the payment transaction for transfer of the selected non-fungible token to the identified transferee, initiating recordal of transfer of the selected non-fungible token to the identified transferee in a record block associated with the distributed blockchain ledger.

The invention provides a computer program product for recording a digital media based non-fungible token on a distributed blockchain ledger. the computer program product comprises a non-transitory computer readable medium having a computer readable program code embodied therein, the computer readable program code comprising instructions for implementing the steps of (i) establishing a cloud services network communication session between a cloud services server and a client terminal, wherein establishing the cloud services network communication session includes assigning to said cloud services network communication session, a network communication channel between the cloud services server and the client terminal, (ii) streaming from the cloud services server to the client terminal, over the network communication channel, data generated by an instance of a software application that is running on the cloud services server, (iii) receiving through the client terminal (a) an instruction to generate a non-fungible token comprising digital media content that has been selected from the data that has been streamed from the cloud services server to the client terminal, and (b) user input identifying the selected digital media content, (iv) generating a non-fungible token record representing the non-fungible token, wherein the non-fungible token record includes data identifying or representing the selected media content, and (v) implementing recordal of the non-fungible token on a distributed blockchain ledger, comprising (c) transmitting the non-fungible token record to a non-fungible token services platform, and (d) storing data from the non-fungible token record in a record block associated with the distributed blockchain ledger.

The invention also provides a computer program product for recording transfer of a digital media based non-fungible token on a distributed blockchain ledger. The computer program product comprises a non-transitory computer readable medium having a computer readable program code embodied therein, the computer readable program code comprising instructions for implementing the steps of (i) receiving at a cloud services server, a request for display of digital media based non-fungible tokens associated with the cloud services server or with a cloud services application that is executed on the cloud services server, (ii) retrieving data corresponding to a set of digital media based non-fungible tokens that are associated with the cloud services server or with a cloud services application, (iii) implementing display of the retrieved data corresponding to the set of non-fungible tokens, (iv) receiving a user input selecting a non-fungible token from within the set of digital media based non-fungible tokens, (v) transmitting to a non-fungible token services platform, a request to reserve the selected non-fungible token for transfer, wherein the non-fungible token services platform is configured to record transfer of non-fungible tokens within a distributed blockchain ledger on which the selected non-fungible token is recorded, (vi) responding to a confirmation message from the non-fungible token services platform confirming that the selected non-fungible token has been reserved for transfer, by implementing a payment transaction for transfer of the selected non-fungible token to an identified transferee and (vii) subsequent to completion of the payment transaction for transfer of the selected non-fungible token to the identified transferee, initiating recordal of transfer of the selected non-fungible token to the identified transferee in a record block associated with the distributed blockchain ledger.

Figure 12:
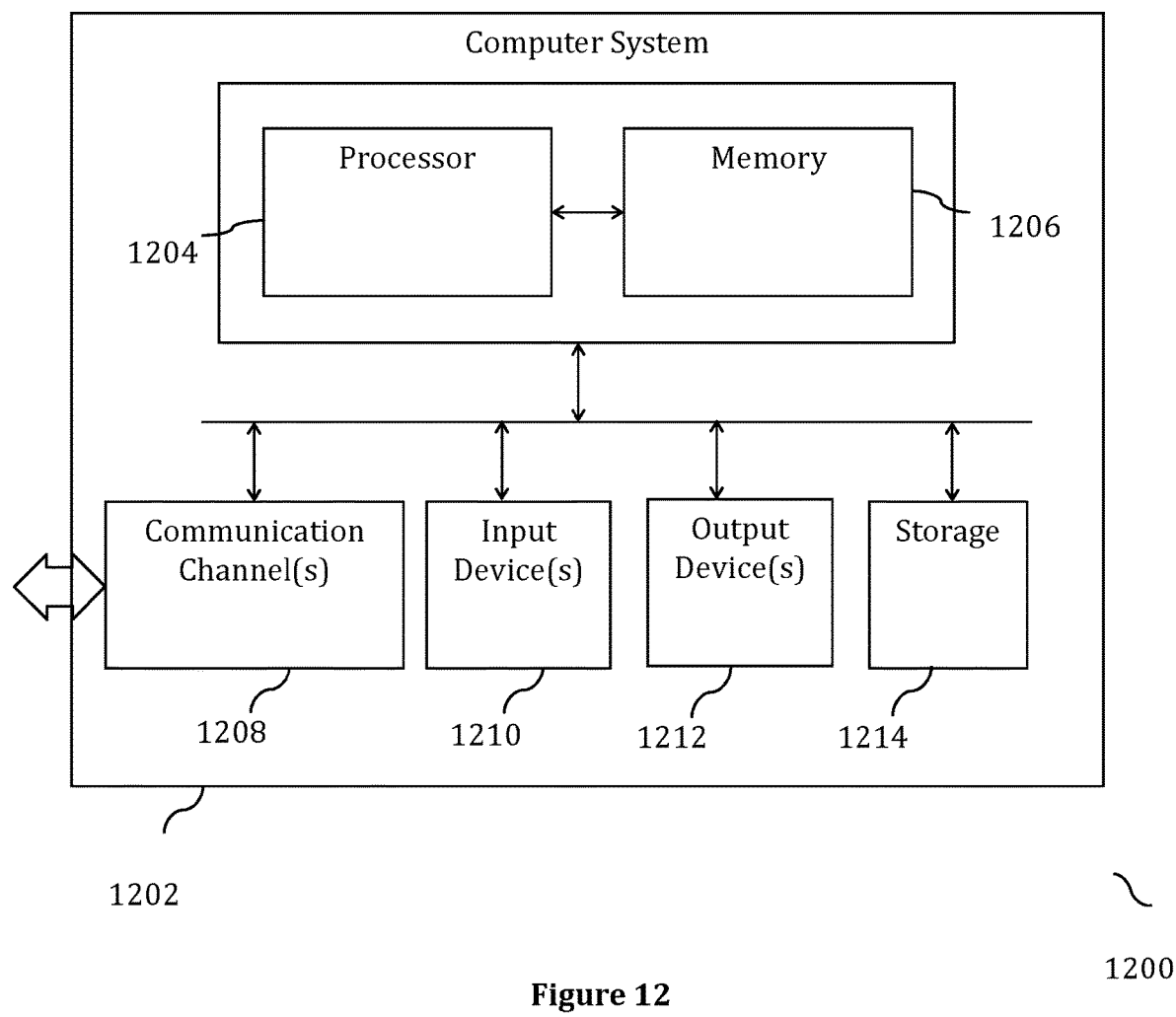
FIG. 12 illustrates an exemplary system for implementing the present invention.

FIG. 12 illustrates an exemplary system 1200 for implementing the present invention. The illustrated system 1200 comprises computer system 1202 which in turn comprises one or more processors 1204 and at least one memory 1206. Processor 1204 is configured to execute program instructions—and may be a real processor or a virtual processor. It will be understood that computer system 1202 does not suggest any limitation as to scope of use or functionality of described embodiments. The computer system 1202 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1202 in accordance with the present invention may include one or more servers, desktops, laptops, tablets, smart phones, mobile phones, mobile communication devices, tablets, phablets and personal digital assistants. In an embodiment of the present invention, the memory 1206 may store software for implementing various embodiments of the present invention. The computer system 1202 may have additional components. For example, the computer system 1202 may include one or more communication channels 1208, one or more input devices 1210, one or more output devices 1212, and storage 1214. An interconnection mechanism (not shown) such as a bus, controller, or network, interconnects the components of the computer system 1202. In various embodiments of the present invention, operating system software (not shown) provides an operating environment for various softwares executing in the computer system 1202 using a processor 1204, and manages different functionalities of the components of the computer system 1202.

The communication channel(s) 1208 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1210 may include, but is not limited to, a touch screen, a keyboard, mouse, pen, joystick, trackball, a voice device, a scanning device, or any another device that is capable of providing input to the computer system 1202. In an embodiment of the present invention, the input device(s) 1210 may be a sound card or similar device that accepts audio input in analog or digital form. The output device(s) 1212 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1202.

The storage 1214 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1202. In various embodiments of the present invention, the storage 1214 may contain program instructions for implementing any of the described embodiments.

In an embodiment of the present invention, the computer system 1202 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1202. The method described herein is typically implemented as a computer program product, comprising a set of program instructions that is executed by the computer system 1202 or any other similar device. The set of program instructions may be a series of computer readable codes stored on a tangible medium, such as a computer readable storage medium (storage 1214), for example, diskette, CD-ROM, ROM, flash drives or hard disk, or transmittable to the computer system 1202, via a modem or other interface device, over either a tangible medium, including but not limited to optical or analogue communications channel(s) 1208. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The invention accordingly provides solutions that enable straightforward, secure and convenient generation of non-fungible tokens arising in connection with cloud based services (for example, cloud based software gaming services), and for securely buying, selling or otherwise transferring ownership or control of such non-fungible tokens.

While the exemplary embodiments of the present invention are described and illustrated herein, it will be appreciated that they are merely illustrative. It will be understood by those skilled in the art that various modifications in form and detail may be made therein without departing from or offending the scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

I claim:

1. A method for recording a digital media based non-fungible token on a distributed blockchain ledger, the method comprising:
    establishing a cloud services network communication session between a cloud services server and a client terminal, wherein establishing the cloud services network communication session includes assigning to said cloud services network communication session, a network communication channel between the cloud services server and the client terminal;
    streaming from the cloud services server to the client terminal, over the network communication channel, data generated by an instance of a software application that is running on the cloud services server;
    receiving at the cloud services server from the client terminal:
        an instruction to generate a non-fungible token comprising digital media content that has been selected from the data that has been streamed from the cloud services server to the client terminal;
        user input identifying the selected digital media content; and
        user input identifying a non-fungible token template, wherein the non-fungible template includes data which determines a layout for displaying the non-fungible token;
    generating at the cloud services server, a non-fungible token record representing the non-fungible token, wherein the non-fungible token record includes data identifying or representing the selected media content and the non-fungible token template; and
    implementing recordal of the non-fungible token on a distributed blockchain ledger, comprising:
        transmitting the non-fungible token record from the cloud services server to a non-fungible token services platform; and
        storing data from the non-fungible token record in a record block associated with the distributed blockchain ledger.

2. The method as claimed in claim 1, wherein the cloud services server:
    receives the instruction to generate the non-fungible token and the user input identifying the selected digital media content from the client terminal;
    generates the non-fungible token record;
    stores the generated non-fungible token record in a memory coupled with the cloud services server;
    transmits to the non-fungible token services platform an instruction to record the non-fungible token on the distributed blockchain ledger; and
    subsequent to recordal of the non-fungible token on the distributed blockchain ledger by the non-fungible token services platform, receives data representing details of the recorded non-fungible token.

3. The method as claimed in claim 2, the cloud services server:
    stores the received data representing details of the recorded non-fungible token; and
    associates said details of the recorded non-fungible token with the stored non-fungible token data record.

4. A system for recording a digital media based non-fungible token on a distributed blockchain ledger, the system comprising a processor implemented cloud services server configured for:
    establishing a cloud services network communication session between the cloud services server and a client terminal, wherein establishing the cloud services network communication session includes assigning to said cloud services network communication session, a network communication channel between the cloud services server and the client terminal;
    streaming from the cloud services server to the client terminal, over the network communication channel, data generated by an instance of a software application that is running on the cloud services server;
    receiving at the cloud services server from the client terminal:
        an instruction to generate a non-fungible token comprising digital media content that has been selected from the data that has been streamed from the cloud services server to the client terminal;
        user input identifying the selected digital media content; and
        user input identifying a non-fungible token template, wherein the non-fungible template includes data which determines a layout for displaying the non-fungible token;
    generating at the cloud services server, a non-fungible token record representing the non-fungible token, wherein the non-fungible token record includes data identifying or representing the selected media content and the non-fungible token template;

implementing recordal of the non-fungible token on a distributed blockchain ledger, comprising transmitting the non-fungible token record from the cloud services server to a non-fungible token services platform;

wherein the non-fungible token services platform stores data from the non-fungible token record in a record block associated with the distributed blockchain ledger.

5. The system as claimed in claim 4, wherein the cloud services server:

receives the instruction to generate the non-fungible token and the user input identifying the selected digital media content from the client terminal;

generates the non-fungible token record;

stores the generated non-fungible token record in a memory coupled with the cloud services server;

transmits to the non-fungible token services platform an instruction to record the non-fungible token on the distributed blockchain ledger; and subsequent to recordal of the non-fungible token on the distributed blockchain ledger by the non-fungible token services platform, receives data representing details of the recorded non-fungible token.

6. The system as claimed in claim 5, wherein the cloud services server:

stores the received data representing details of the recorded non-fungible token; and associates said details of the recorded non-fungible token with the stored non-fungible token data record.

7. A computer program product for recording a digital media based non-fungible token on a distributed blockchain ledger, the computer program product comprising a non-transitory computer readable medium having a computer readable program code embodied therein, the computer readable program code comprising instructions for implementing the steps of:

establishing a cloud services network communication session between a cloud services server and a client terminal, wherein establishing the cloud services network communication session includes assigning to said cloud services network communication session, a network communication channel between the cloud services server and the client terminal;

streaming from the cloud services server to the client terminal, over the network communication channel, data generated by an instance of a software application that is running on the cloud services server;

receiving at the cloud services server from the client terminal:

an instruction to generate a non-fungible token comprising digital media content that has been selected from the data that has been streamed from the cloud services server to the client terminal;

user input identifying the selected digital media content; and user input identifying a non-fungible token template, wherein the non-fungible template includes data which determines a layout for displaying the non-fungible token;

generating at the cloud services server, a non-fungible token record representing the non-fungible token, wherein the non-fungible token record includes data identifying or representing the selected media content and the non-fungible token template; and implementing recordal of the non-fungible token on a distributed blockchain ledger, comprising:

transmitting the non-fungible token record from the cloud services server to a non-fungible token services platform; and storing data from the non-fungible token record in a record block associated with the distributed blockchain ledger.

* * * * *